United States Patent [19]

Towlson

[11] Patent Number: 4,755,034

[45] Date of Patent: Jul. 5, 1988

[54] ELECTROSTATIC PRECIPITATOR FOR A LIGHT VALVE OF THE SCHLIEREN DARK FIELD TYPE

[75] Inventor: Howard E. Towlson, Baldwinsville, N.Y.

[73] Assignee: General Electric Company, Phila., Pa.

[21] Appl. No.: 901,066

[22] Filed: Aug. 26, 1986

[51] Int. Cl.[4] .............................................. G02B 26/00

[52] U.S. Cl. .................................................... 350/361

[58] Field of Search .............. 350/361, 162.15, 162.12, 350/162.17; 210/748, 702; 204/186, 149, 14 R

[56] References Cited

U.S. PATENT DOCUMENTS

| | | | |
|---|---|---|---|
| 3,874,786 | 4/1975 | Towlson | 350/361 |
| 4,533,216 | 8/1985 | Orser et al. | 350/361 |
| 4,569,739 | 2/1986 | Klinkowski | 204/186 |

*Primary Examiner*—Eugene R. Laroche
*Assistant Examiner*—Nathan W. McCutcheon
*Attorney, Agent, or Firm*—Stephen A. Young; Paul Checkovich

[57] ABSTRACT

An electrostatic precipitator is provided in a light valve of the Schlieren dark field type. The electrostatic precipitator comprises two conductive surfaces within the fluid reservoir of the light valve. One of these surfaces may be the filter housing (81), and the other may be a metal coating (105) which is applied to the inner glass surface of the rear housing (53) of the light valve. By applying a constant d.c. potential across these two conductive surfaces, a resinous or lacquer build-up occurs which is composed of the fine colloidal particulate wear material and a fluid related component which are produced as a result of the normal operation of the light valve. Both the wear material and the fluid related component are too fine to be filtered by mechanical means. Because the wear material and the fluid related component form an adherent resinous material which bonds to the negative electrode, these particulates are permanently removed from the fluid.

4 Claims, 4 Drawing Sheets

ELECTROSTATIC PRECIPITATOR FOR A LIGHT VALVE OF THE SCHLIEREN DARK FIELD TYPE

BACKGROUND OF THE INVENTION

1. Field of the Invention

The present invention generally relates to improvements in light valve projection systems of the Schlieren dark field type and, more particularly to an electrostatic precipitator which is effective for the removal of colloidal and other particulates which cannot be easily removed from the light modulating fluid medium during the operating life of the light valve by standard filtering methods.

2. Description of the Prior Art

Light valve projection systems of the Schlieren dark field type have been in commercial use for many years and are capable of providing excellent performance. Typical prior art color projection systems of this type are shown in U.S. Pat. Nos. 3,290,436, 3,352,592 and 3,437,746, all of which were issued to W. E. Good et al. The principles of operation of this type of projection system are briefly described with reference to FIGS. 1, 2 and 3 of the drawings.

With reference first to FIG. 1, there is schematically shown a single-gun television light valve assembly comprising a lamp 10, sealed light valve 12, and Schlieren projection lens 14. The sealed light valve 12 comprises a glass envelope which contains an electron gun 16, input slots 18, focus-deflection system 20, a control layer 32 on a rotatable disk 22, and a fluid reservoir 24.

The electron gun 16 generates, from anode aperture 11, an electron beam which is used to "write" charge patterns on the control layer 32. These patterns create surface deformations in the layer and form light diffraction gratings. The electron beam is focused, deflected, and modulated by electrodes 23, 25, 27, and 21. The control layer surface deformations diffract and modulate the light rays passing through the layer 32 and disk 22.

The focus-deflection system 20 comprises three electrode sets each having four orthogonal electrodes, which form three electrode "boxes", referred to as boxes 23, 25 and 27, and a cylindrical electrode 21. The first of these, box 23, is arranged about the aperture in the input window and serves to center and allow predeflection of the electron beam. The next two boxes, boxes 25 and 27, have DC and AC voltages applied to them in a manner to achieve a uniformly focused electron beam image of aperture 11 which is scanned across the raster plane on control layer 32. This, in turn, permits the control layer fluid to be modulated uniformly by charge control to produce a uniformly colored projected image. following the focus-deflection boxes 25 and 27 is a drift ring 21 which serves, with a transparent electrode on disk 22, as an element of the final electron lens in the focus-deflection system 20.

Specific examples of light modulating fluids are disclosed in U.S. Pat. Nos. 3,288,927 to Ralph W. Plump, 3,317,664 and 3,317,665 both to Edward F. Perlowski, Jr., 3,541,992 to Carlyle S. Herrick et al, and 3,761,616 issued to C. E. Timberlake. These fluids may include additives as taught by U.S. Pat. Nos. 3,764,549 and 3,928,394 to David A. Orser. In general, the control layer or light modulating fluid is a very special chemical compound, modified with special additives, having the electro-mechanical and visco-elastic properties needed to produce effective control layer properties in the electron beam addressed light valve.

The basic light collection system includes an arc lamp 10, which may be a Xenon lamp, the arc of which is located at the focus of a reflector system, which may be a simple ellipsoidal reflector, as shown, or a compound reflector, as disclosed for example in U.S. Pat. No. 4,305,099 to Thomas T. True et al. The light from the arc is reflected from the reflector through a pair of spaced lens plates having corresponding pluralities of rectangular lenticules arranged in horizontal rows and vertical columns. The first lens plate is shown in FIG. 1 at 28 and the second lens plate is formed on the light input surface of the glass envelope of the light valve 12. The light from the lamp 10 is projected through a color filter plate 26 and the lenticular lens 28 before entering the light valve 12.

The interior surface of the glass envelope of the light valve 12 carries the input light mask in the form of slots 18 which, for example, may be applied by vapor deposition. The input slots 18 are a series of transparent slots and alternating opaque bars in a pattern generally as indicated in FIG. 1. The filtered light rays from the lamp 10 pass into the light valve 12 through these transparent slots. The lenslets of the lenticular lens 28 and the corresponding lenslets, formed on the light input surface of the glass envelope of the light valve 12, form condensing lens pairs which first focus spots of filtered light onto the slots of the light mask and then re-image the light rays onto the control layer raster plane 32. With this arrangement, efficient utilization is made of light from the arc lamp, and uniform distribution of light is produced, in a rectangular pattern, on the light modulating medium or control layer 32.

The Schlieren projection lens 14 includes Schlieren lens elements 29, output color selection bars 30 and a projection lens system 31. The output selection bars 30 are the complement of the input slots 18. That is, on the output bar plate, the bars are optically aligned with the slots of the input slots 18 so that, in the absence of a diffraction of light passing through the control layer 32, light rays are focused and terminated on the bars of the output bar plate. This creates a "dark field" condition, i.e., no light is transmitted in the absence of a modulating signal superimposed on the raster scanning signals applied to the horizontal and vertical deflection plates of the deflection system 20. It should be noted, however, that the electron beam which scans the raster and provides charge to the control layer is a constant current electron beam, there being no modulation of the intensity of the beam produced by the electon gun 16 (other than during the horizontal and vertical retrace intervals when the beam is off).

The lower half of FIG. 1 shows the cross sections of the light body and light valve components. The spectral diagrams at the bottom indicate how the light is prefiltered before entering the light valve.

FIG. 2 is a simplified light valve diagram showing the color selection action of the three basic gratings. The control layer 32 which is supported by the disk 22 (shown in FIG. 1) is illustrated as having three different diffraction gratings for red, green and blue light components. These diffraction gratings may be written individually or simultaneously and normally are actually superimposed but, for purposes of illustration only, they are shown in FIG. 2 as separated on the control layer 32.

In the light valve projection system shown in FIGS. 1 and 2, green light is passed through the horizontal slots of the input bar plate 18 and is controlled by diffraction gratings formed by modulating the height of the scanned raster lines on the control layer 32. This is done by controlling the amplitude of a high frequency carrier applied to the vertical deflection plates as modulated by the green video signal as shown in FIG. 3. Magenta (red and blue) light is passed through the vertical slots of the input bar plate 18 and is controlled by charge generated diffraction gratings created at right angles to the raster lines by velocity modulating the electron spot as it is scanned in the horizontal direction. In the example shown in FIG. 3, this is done by applying a 16 MHz (12 MHz for blue) signal to the horizontal deflection plates and modulating it with the red video signal as shown in FIG. 3. The grooves created in the control layer 32 have the proper spacing to diffract the red portion of the spectrum through the vertical output slots in plate 30 while the blue portion is blocked. (When the 12 MHz carrier is used, the blue light is passed by the vertical slots in plate 30 and the red light is blocked.)

Thus, three simultaneous and superimposed primary color pictures can be written with the same electron beam and projected to the screen 33 as a completely registered full color picture. Colors are created by writing miniture diffraction gratings within each picture element on the fluid surface by manipulating the single scanning electron beam. These gratings diffract the transmitted light rays away from their terminations at the output bars where they are spatially filtered to let the desired color reach the screen. The amount of light diffracted is dependent on the depth of the gratings formed in the control layer. This technique permits a full color television picture to be written on a single control layer with no need for further registration.

FIG. 3 shows in block diagram form the basic light valve projector circuitry. A composite video signal is supplied to the input of a decoder 34 which provides at its output red, blue and green video signals. These signals are respectively applied to modulators 36, 38 and 40. A grating generator 42 supplies carrier signals which, in the case illustrated, have frequencies of 16 MHz and 12 MHz, respectively, to modulators 36 and 38 and a signal having a frequency of 48 MHz to modulator 40. The outputs of the red and blue modulators 36 and 38 are combined and superimposed on the horizontal deflection signal from the horizontal deflection signal generator 44. The output of the green modulator 40 is superimposed on the vertical deflection signal from the vertical deflection generator 46.

The basic Schlieren dark field light valve projector as schematically illustrated in FIGS. 1, 2 and 3 has evolved over a period of years to be a highly efficient projector producing excellent quality pictures of good color balance and high resolution. However, a continuing problem is the filtering of the light modulating fluid to remove particles, which if not removed, would cause diffraction and/or scattering of the light were the particles to be in the raster area on the rotating disk. Very fine colloidal, wear-generated, material and fluid related damaged material tend to build up on the quality glass surfaces and gradually reduce the light transmission or at least color the light. These materials are continuously generated in the light valve during its operation and require removal if the quality of the projected light is to be maintained throughout the life of the light valve.

In my earlier U.S. Pat. No. 3,874,786, I describe a system for getting the particles floating in the fluid, between the rotating disk and the inside of the output window, out of this region and into the main fluid sump so the larger particles can be filtered out by the mechanical pump and filter which operate in the the sump. In that system, I provide an electrode to which a potential is applied. This potential is switched from positive to negative to cause the large particles to move alternately off the disk and onto the window and vice versa. As the disk rotates, the particles attracted to the disk are rotated into the 6 o'clock position where they are repelled into the main fluid sump when the applied voltage polarity is reversed. This technique is used only in initial processing of the light valve because it is not possible to alter the voltage on the surfaces in question when the light valve is assembled into a projector. There are, however, other smaller particulates which are not effectively filtered by mechanical means.

SUMMARY OF THE INVENTION

It is an object of this invention to provide improvements in the design and manufacture of light valve projection systems of the Schlieren dark field type.

It is another more specific object of the invention to provide an improved filtering system for the light modulating fluid in a light valve of the Schlieren dark field type.

It is a further object of the present invention to provide a filtering system for a light valve of the Schlieren dark field type, which filtering system is effective in removing not only the larger particles in the light modulating fluid but is also effective in removing the very fine collodial wear generated material particulate and possibly damaged fluid related component material which tend to build up on the quality glass surfaces and gradually reduce the light transmission or at least color of the light of the light valve.

I have found that if a constant d.c. potential is applied between two conductive surfaces in the fluid, a resinous or lacquer build-up occurs which is composed of the fine wear particulate material, which cannot be filtered out by normal mechanical type filters, and the fluid related component material which tend to bind the permanently to one electrode. Thus, when the voltages are turned off, the collected material are not released back into the main stream of the light modulating fluid. The electrostatic precipitator and collection system according to the invention is used during the operating life of the light valve and uses a voltage potential which is normally available from the projector. The electrostatic precipitator of my invention differs from known electrostatic precipitators in that in known precipitators, various mechanical traps are used to prevent the collected materials from being redistributed into the filtered fluid stream when the collecting potentials are turned off. Such mechanical traps are not practical in the light valve due to size, cleanliness and high temperature hard vacuum processing to which the light valve is subjected during processing and final operation.

BRIEF DESCRIPTION OF THE DRAWINGS

The foregoing and other objects, aspects and advantages of the invention will be better understood from the following detailed description with reference to the drawings, in which.

DETAILED DESCRIPTION OF THE PREFERRED EMBODIMENT OF THE INVENTION

Figure 4:
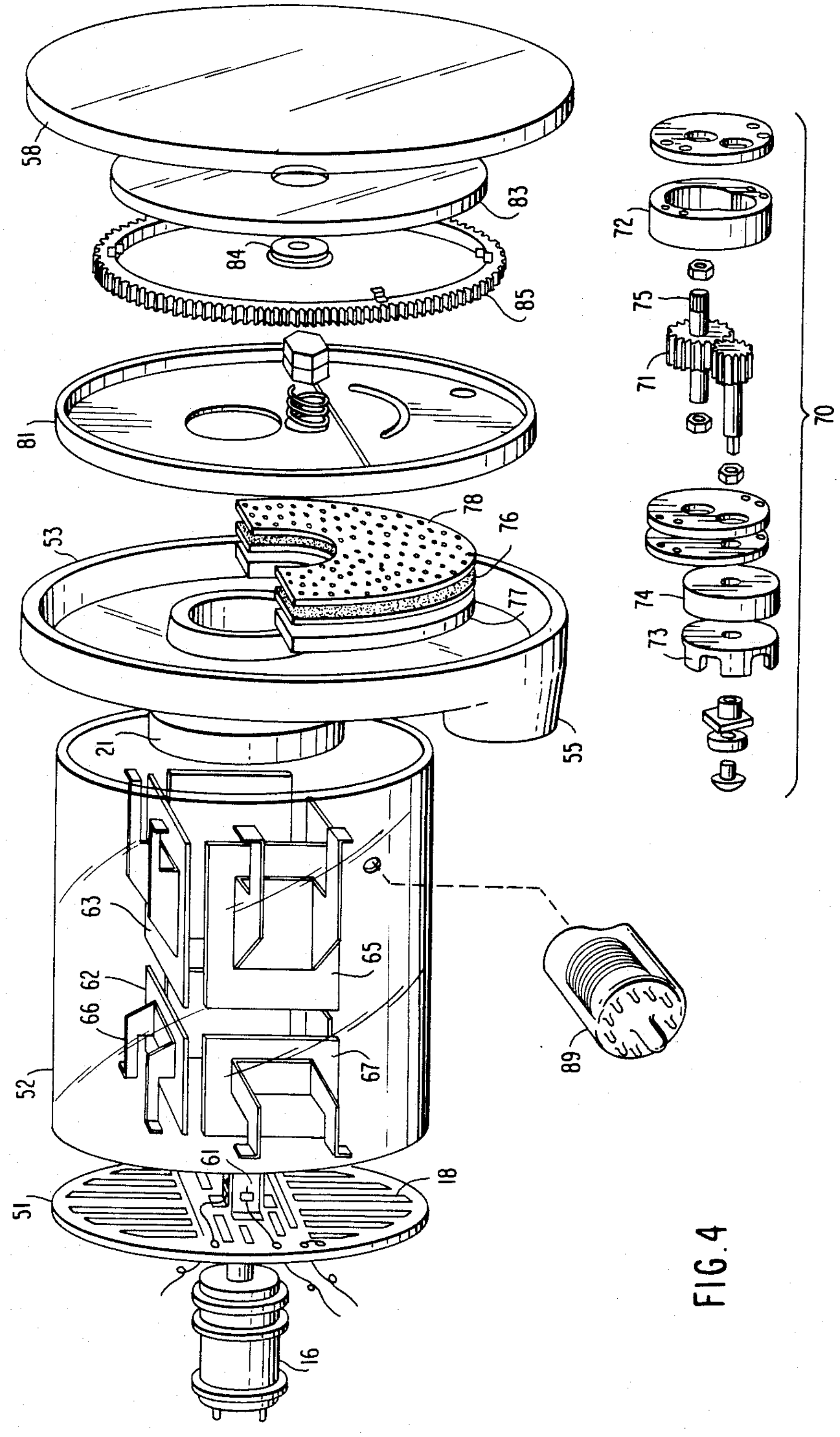
FIG. 4 is an exploded perspective view of major elements of a new generation of light valves which embody the invention.

In the drawings, like reference numerals used in the several figures indicate the same or corresponding components. Referring again to the drawings, and more particularly to FIG. 4, there is shown an exploded view of the internal vacuum components of a new generation of Schlieren dark field light valve. The vacuum enclosure comprises an input window 51, a focus deflection cylinder 52, a rear housing 53 which has a molded recess 55 for receiving a pump assembly 70, and a face plate 58. The electron gun assembly 16 is attached to a central aperture of the input window 51, and the input slots or bar plate 18 are formed on the interior surface of the input window 51, in a manner functionally similar to the earlier light valves of this type.

Figure 1:
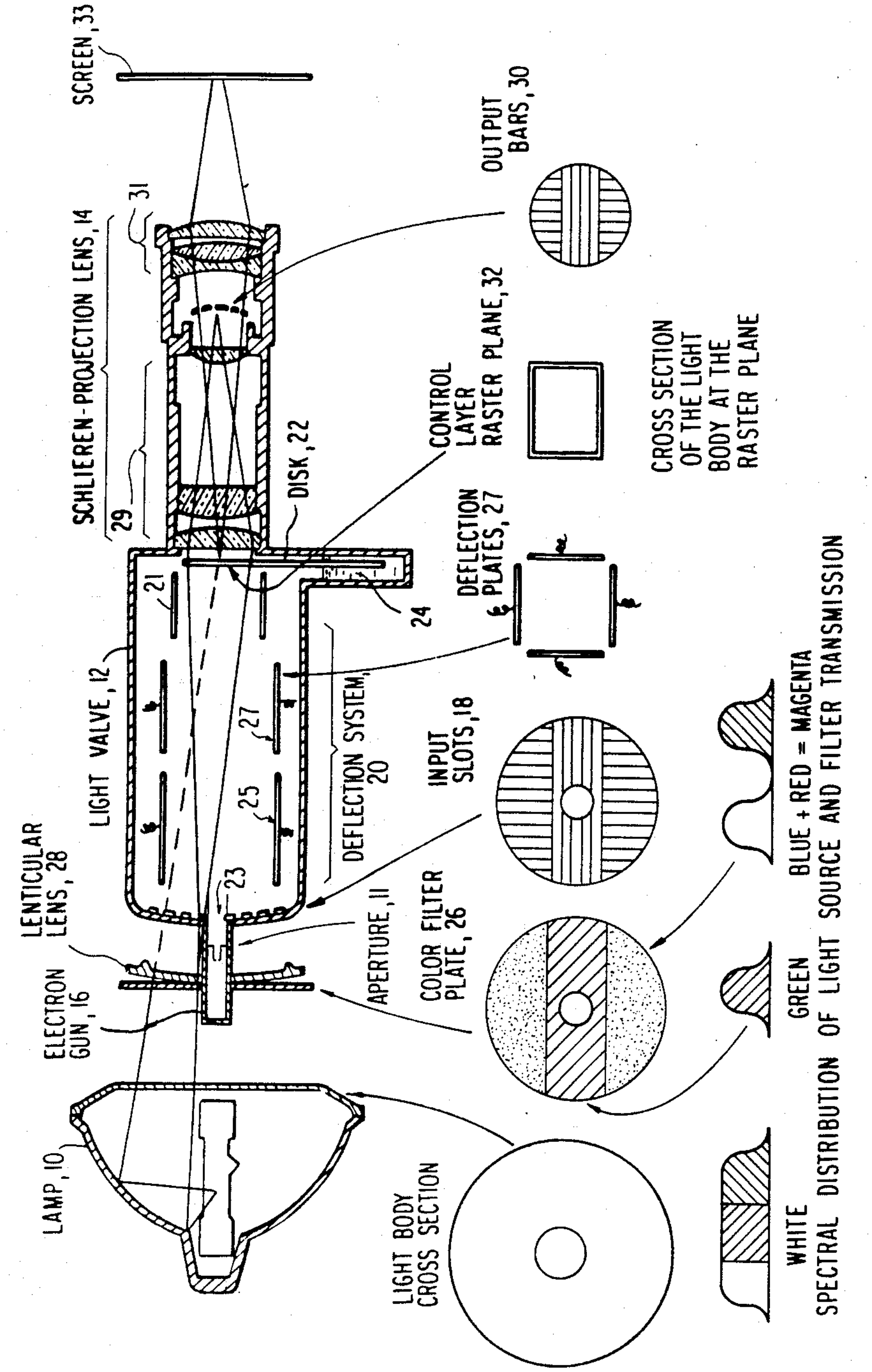
FIG. 1 PRIOR ART
FIG. 1 is a simplified cross-sectional view showing the construction of a prior art light valve projection system.
Figure 2:
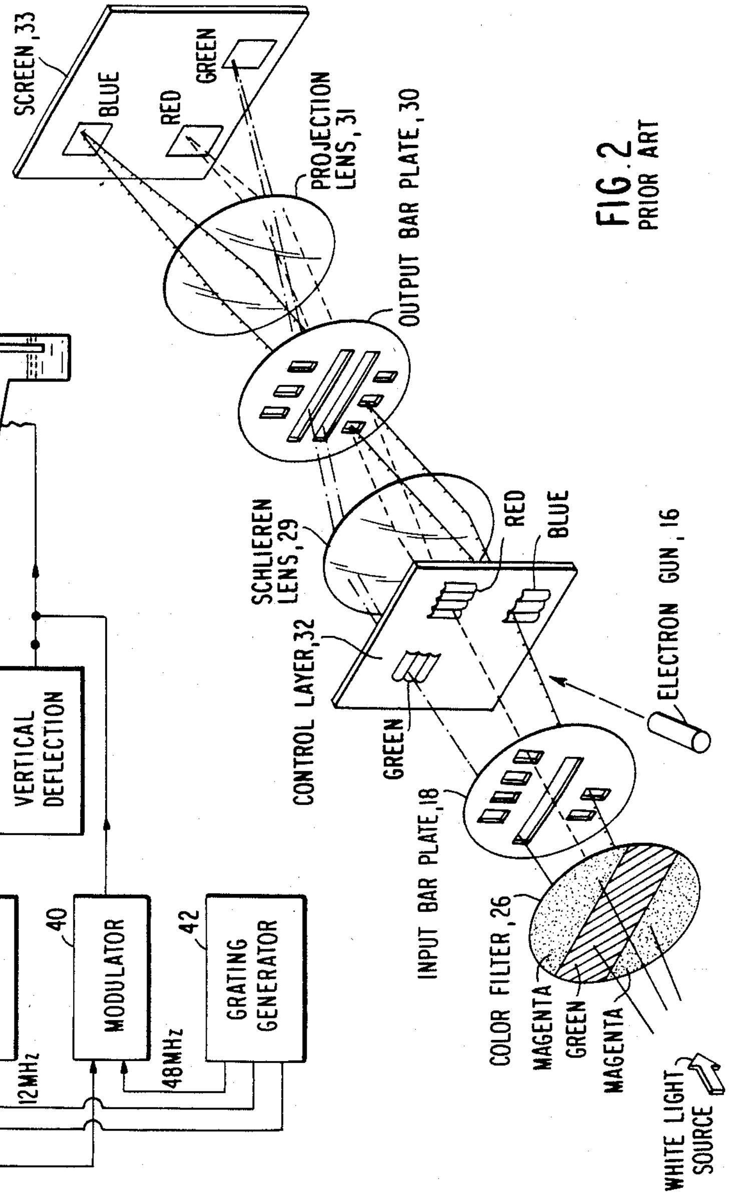
FIG. 2 PRIOR ART
FIG. 2 is a simplified perspective view illustrating the principles of operation of the prior art light valve projection system.
Figure 3:
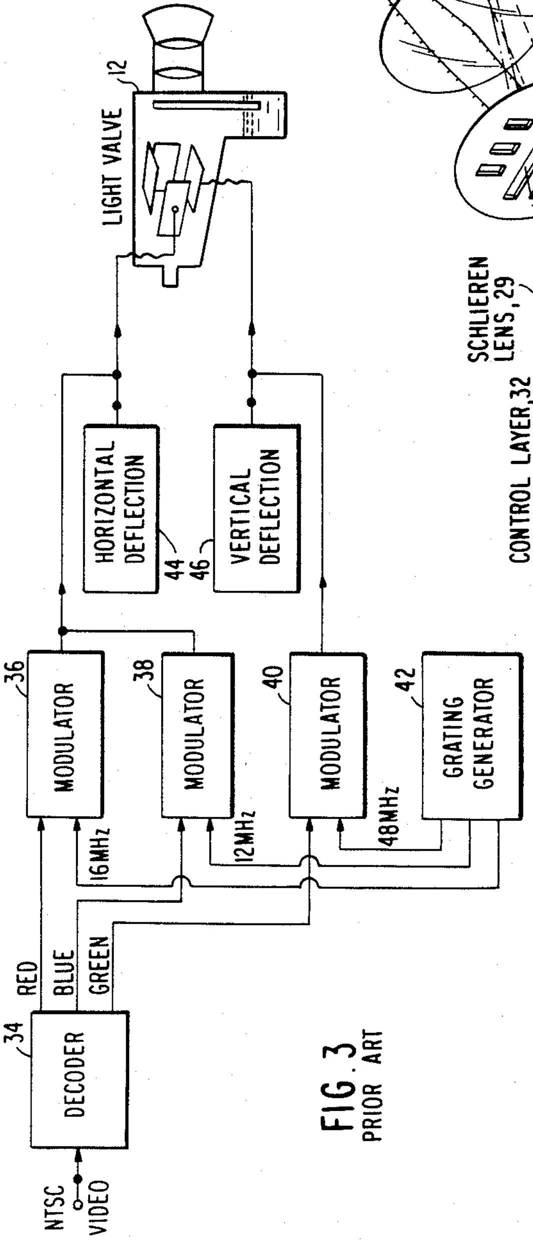
FIG. 3 PRIOR ART
FIG. 3 is a block diagram showing the basic circuitry of a modulated deflection system of the prior art light valve projection system.

The focus and deflection assembly comprises three sets of electrodes. One set of four electrodes 61, comprising a pair of horizontal plates and a pair of vertical plates, is attached to the input window 51 about its central aperture. A pair of vertical deflection plates 62 and a pair of horizontal deflection plates 67 located within the cylinder 52 form the second set. The third set is comprised of the vertical deflection plates 63 and the horizontal deflection plates 65. As shown in FIG. 4, the deflection plates 62, 63, 65, and 67 are supported within the cylinder 52 by means of brackets 66 which also provide the electrical connections to the deflection plates. Beyond the deflection plates 63 and 65 and within the rear housing 53 is a cylindrical drift ring 21 which, with a transparent electrode on disk 83, (equivalent to disk 22 in FIG. 1) completes the focus-deflection system.

A gear pump assembly, generally indicated at 70, is located within the recess 55 of the rear housing 53. The gear pump comprises gears 71 within a housing 72 driven by a magnet 73. The magnet 73 is coupled to a rotating magnet driven by an electric motor (not shown) axially aligned with the pump 70 on the exterior rear face of the recess 55 that houses the pump. An axial shield 74 is provided for the magnet 73 so that its magnetic field does not affect the electron beam. Other magnetic shielding is provided within the light valve projection system to prevent the electron beam from being affected by magnetic fields at the projector or due to the earth's magnetic field.

The rear housing 53, including the recess 55 which houses the pump assembly 70, and the face plate 58 generally define the reservoir 24 (schematically illustrated in FIG. 1) which contains the light modulation fluid. The gear pump 70 is located in the reservoir 24 and operates to pump the fluid through a filter 76. The filter 76 is sandwiched between a filter housing 77 and a perforated panel 78, and this assembly is secured to the lower rear face of a baffle 81. The baffle 81 is a generally circular disk with a forwardly projecting flange which surrounds the rotatable disk 83. The disk 83 is supported for rotation by a bearing 84 through which projects a pin mounted in the center of baffle 81. A ring gear 85 is attached to the peripheral edge of the disk 83 and is driven by a pinion gear 75 that projects from the gear pump 70.

Attached to the side of the cylinder 52 is a vacuum maintenance device 89, which collects gaseous materials remaining in the envelope after it is sealed and which are generated as a product of the operation of the light valve.

Figure 5:
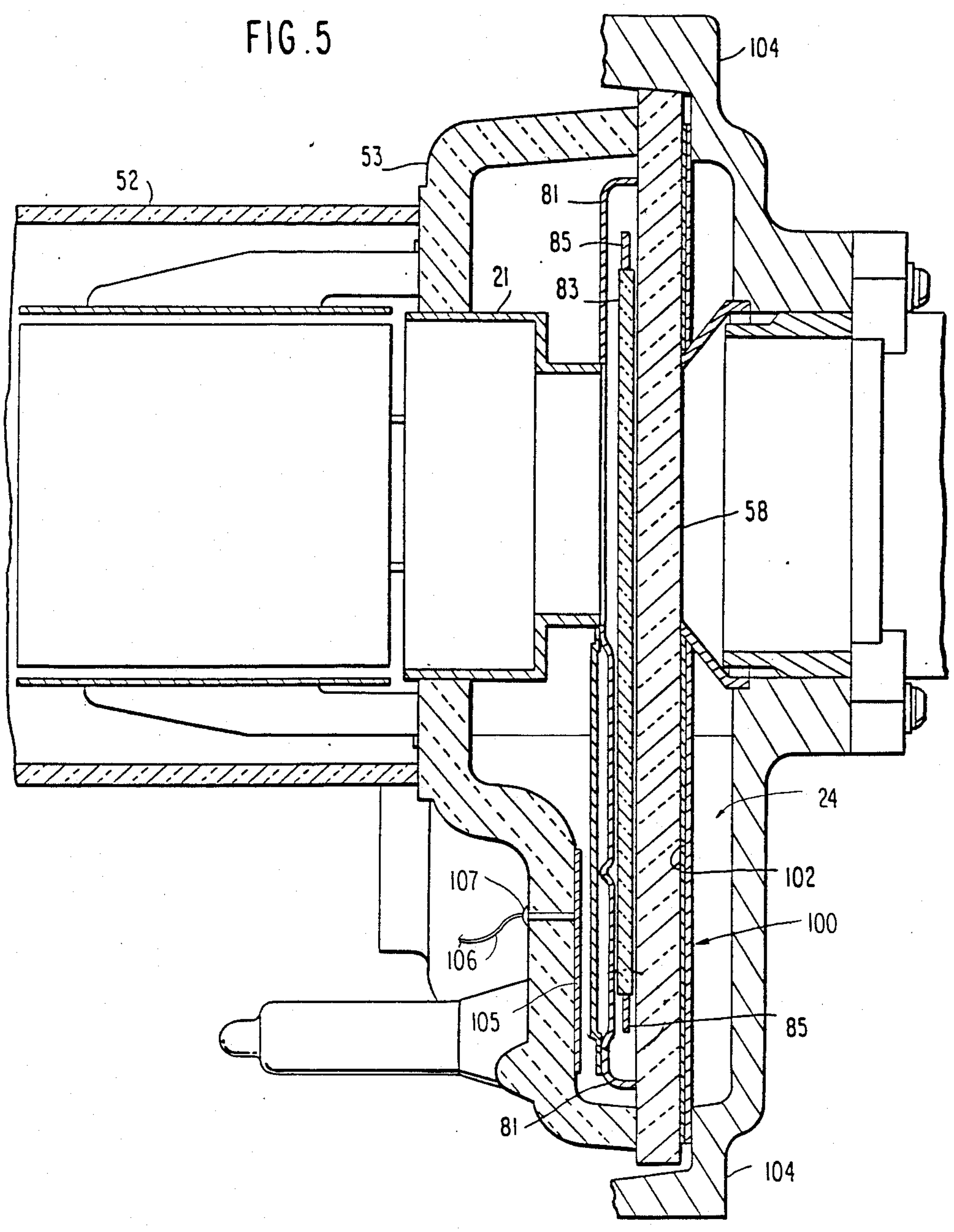
FIG. 5 is an enlarged cross-sectional view of the sump portion of the light valve showing the electrodes of one implementation of the electrostatic precipitator according to the present invention.

An implementation of the electrostatic precipitator according to the invention is illustrated in FIG. 5 of the drawings. In FIG. 5, the disk 83 and the output window 58 are shown in closely spaced relationship. The light valve mounting hardware 104, electrical mat heater 100, and the shielding electrode 102, which operates at ground potential, are also shown. According to the invention, a metal coating in film 105, such as aluminum, is applied by vapor deposition, for example, to the inner glass surface of the rear housing 53.

It has been determined from bench testing and tube testing that a set of electrodes nominally parallel and spaced such that a potential gradient nominally about 10 volts d.c./0.001" (one mil) would deposit the detrimental wear material and possibly electron beam damaged fluid onto the more negative electrode. The electrodes must be arranged such that they are immersed in the fluid and that the fluid circulate between the electrodes. These conditions are approximately met in the light valve design shown in FIG. 5 by applying the metal film 105 to the inner glass surface or rear housing 53 which is below the fluid level in the reservoir 24. The metal film in one specific embodiment of the invention is aluminum; however, other conductive and vacuum compatible materials can be used. Electrical connection to this film is made by a wire 106 which passes through a hole in rear housing 53 and contacts the aluminum film 105. The wire is held in place and a vacuum tight connection made by sealing the wire using a glass frit sealing material such as Corning 7575.

In the operation of the light valve, the baffle plate 81, which constitutes part of the filter housing, is connected to a positive potential of 2000 volts d.c. or more, and preferably approximately 5000 volts d.c. With the mechanical spacing present in the light valve, the 10 volts/mil gradient is obtained merely by connecting the aluminum surface to ground by means of the wire 106. Thus, no other potential source is required. The wear generated material and other organic material tend to collect on the aluminum electrode. The reason for this is believed to be that in the presence of the electric field, the organic fluid forms a matrix with the metallic wear material. This in turn is firmly bonded to the aluminum electrode and prevents the material from becoming remixed with the fluid when the electric potential is turned off.

In the specific embodiment which is shown and described, the filter housing, and specifically the baffle plate 81, is used as the electrode which cooperates with the precipitator electrode film 105. In alternative forms of the invention, other metallic structures within the reservoir of the light valve could be used as the electrode which cooperates with the precipitator electrode film. Thus, while the invention has been described in terms of a single preferred embodiment, those skilled in the art will recognize that the invention can be practiced with modification and variation within the spirit and scope of the appended claims.

Having thus described my invention, what I claim as new and desire to secure by Letters Patent is as follows:

1. In a light valve of the Schlieren dark field type having a rotatable disk spaced from an output window and a reservoir containing a light modulating fluid for coating said disk, said fluid containing impurities, said disk being partially within said reservoir and said reservoir being defined by said output window and a rear housing within which is located a gear pump and a filter within a filter housing for mechanically filtering said fluid, said filter housing serving as a first electrode, the improvement comprising:

a precipitator electrode within said reservoir; and means for connecting a source of potential to said precipitator electrode for establishing a potential difference between said precipitator electrode and said first electrode, said precipitator electrode being electrically grounded and said first electrode having a potential greater than or equal to 2000 volts applied thereto to provide a field strength between said precipitator electrode and said first electrode of greater than or equal to ten volts per mil, whereby the impurities are collected on said precipitator electrode and permanently bonded thereto.

2. The improvement as recited in claim 1 wherein said precipitator electrode comprises a metallic film deposited on the inside of said rear housing.

3. The improvement as recited in claim 2 wherein said metallic film is aluminum.

4. In a light valve of the Schlieren dark field type having a rotatable disk spaced from an output window and a reservoir containing a light modulating fluid for coating said disk, said disk being partially within said reservoir and said reservoir being defined by said output window and a rear housing within which is located a filter housing including therein a gear pump and a filter for mechanically filtering said fluid, said filter housing being a first electrode, the improvement comprising:

a precipitator electrode within said reservoir; and means for connecting a source of potential to said precipitator electrode for establishing a potential difference between said precipitator electrode and said first electrode, said precipitator electrode being electrically grounded and said first electrode having a potential greater than or equal to 2000 volts applied thereto to provide a field strength between said precipitator electrode and said first electrode of greater than or equal to ten volts per mil.

* * * * *